F. F. GROFF.
PANORAMA ATTACHMENT FOR CAMERAS.
APPLICATION FILED DEC. 30, 1908.

946,800.

Patented Jan. 18, 1910.
2 SHEETS—SHEET 1.

WITNESSES:
James E. Boyle
Mabel L. Lefevre

INVENTOR
Frederick F. Groff,
BY
John J. Thompson
ATTORNEY

F. F. GROFF.
PANORAMA ATTACHMENT FOR CAMERAS.
APPLICATION FILED DEC. 30, 1908.
946,800.
Patented Jan. 18, 1910.
2 SHEETS—SHEET 2.
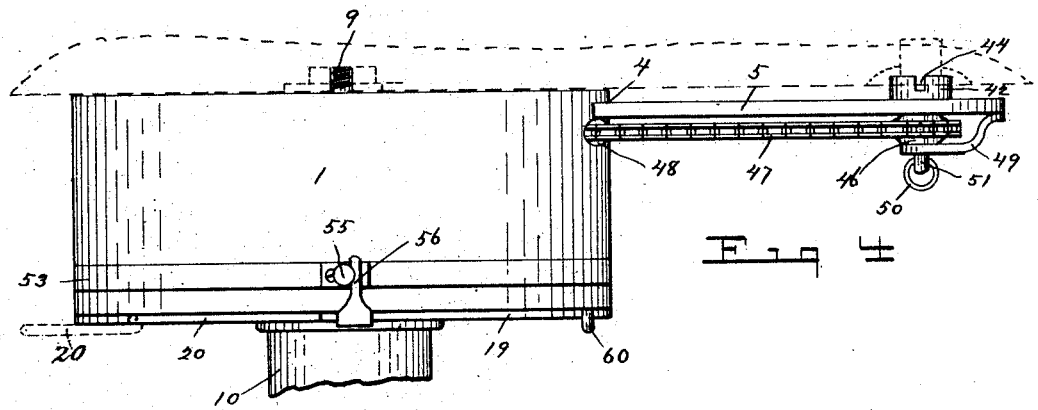
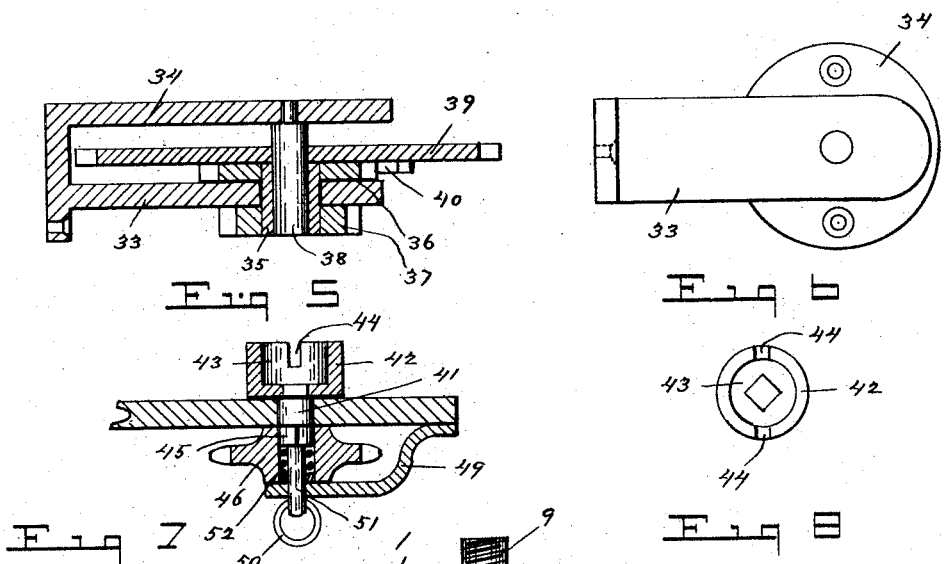
WITNESSES:
James E. Boyle
Mabel L. Lefevre
INVENTOR
Frederick F. Groff,
BY
John J. Thompson
ATTORNEY

UNITED STATES PATENT OFFICE.

FREDERICK F. GROFF, OF LANCASTER, PENNSYLVANIA.

PANORAMA ATTACHMENT FOR CAMERAS.

946,800.  Specification of Letters Patent.  Patented Jan. 18, 1910.

Application filed December 30, 1908. Serial No. 470,119.

*To all whom it may concern:*

Be it known that I, FREDERICK F. GROFF, a citizen of the United States, residing at Lancaster, in the county of Lancaster and State of Pennsylvania, have invented certain new and useful Improvements in Panorama Attachments for Cameras, of which the following is a specification, reference being had therein to the accompanying drawing.

My invention relates to an attachment for a photographic camera to render it capable of making panoramic exposures, and is especially intended for use with the usual style of camera using a film spool.

My present invention is an improvement over my Patent No. 908,091, dated Dec. 29, 1908, and consists in several changes and novel constructions which will hereinafter be fully described and claimed.

By my novel construction my panoramic attachment may be quickly adjusted for use with cameras of different sizes, and also regulated as to the length of film to be exposed and the number of degrees through which the camera shall be revolved.

With these and other objects in view my invention consists in an attachment which may be secured between the camera and tripod in such a manner that it will revolve upon itself as actuated by a self-contained motor, or may be operated by hand, thus revolving the camera, and at the same time and with the required speed it will also wind the film within the camera from one spool to the other thus exposing its surface back of the lens as required.

The objects of my invention are to produce a simple, cheap and readily attached device of this class and one that may be quickly adapted to cameras of varying sizes, and easily attached and detached.

While I have here described and claimed my invention as illustrated in the accompanying drawings forming a part of this application, it is fully understood that I do not confine myself to the exact construction as shown, as slight changes may be made in the construction and combination of parts without departing from the spirit of the invention.

Figure 1:
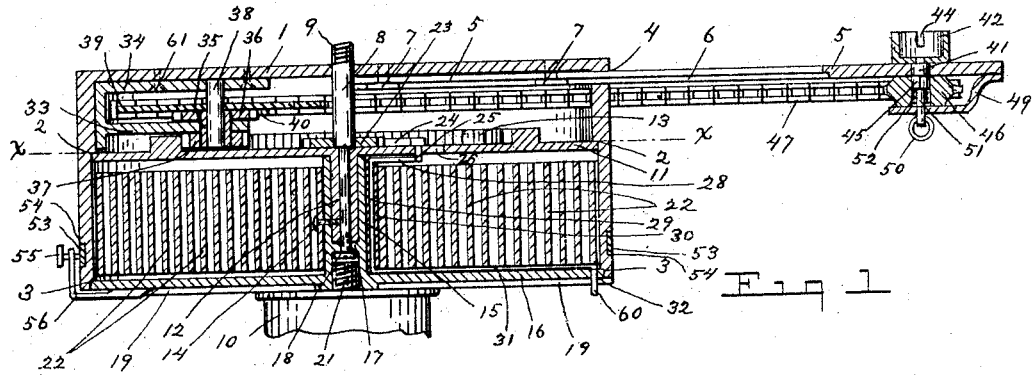
Figure 2:
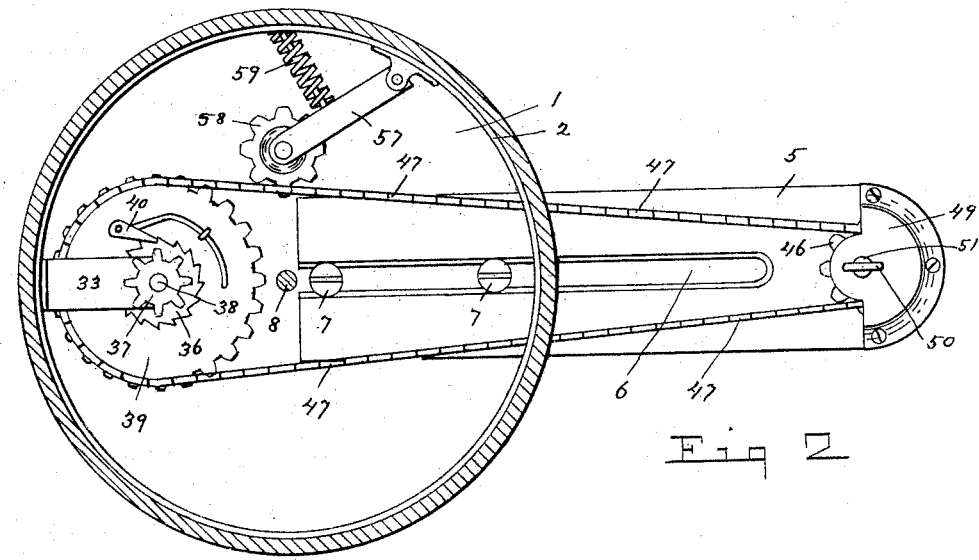
Figure 3:
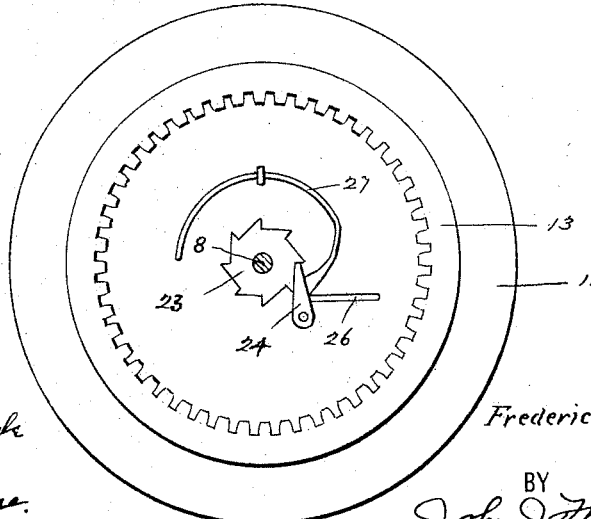

In the accompanying drawings forming a part of this application and in which like figures of reference refer to corresponding parts in all of the views, Figure 1, is a vertical sectional view of the device, taken on a central line, with the camera removed. Fig. 2, is a horizontal sectional view, taken on the line X X of Fig. 1, looking upward. Fig. 3, is a top plan view of the main gear plate removed from the attachment. Fig. 4, is a side elevation of the device, showing the method of attaching it to the camera and to the tripod. Fig. 5, is a central sectional elevation of the gear case in detail. Fig. 6, is a bottom plan view of the same, with the gears removed. Fig. 7, is a sectional vertical detail view of the end of the arm and spool operating means. Fig. 8, is a top plan view of the spool attaching clamp. Fig. 9, is a vertical detail sectional view of the pivot construction in detail.

Referring to the drawings, 1, indicates a circular case formed with the interior concentric bearing surfaces 2, and 3, in the side wall thereof. Near the top of said case 1, in the side wall thereof, is provided the horizontal slot 4, through which extends the adjustable arm 5, which is formed with the longitudinal vertical orifice 6, through which are passed the guide and securing screws 7, which are screw-threaded into the lower surface of the top of said case 1, and which serve to secure the arm at any desired extension. The center of said case 1, is provided with the pivot post 8, having its upper end extending above the top of said case and rigidly secured thereto, while its extending end 9, is screw-threaded for the purpose of attaching the device to the camera in place of the usual tripod 10. Within the case 1, the pivot post 8, is reduced in diameter and has rotatably mounted thereon the main gear plate 11, which is formed with the downwardly extending sleeve 12, and the concentric internal gear 13, upon its upper surface; while the periphery of said gear plate 11, rotates upon the bearing surface 2, in the side wall of the case 1.

Embracing the outer surface of the sleeve 12, and detachably secured thereto by the screw 14, is the sleeve 15, which is integral with and extends upward from the upper surface of the bottom plate 16, and which is also provided with the inner shoulder 17, embracing the lower end of the pivot post 8, and detachably attached thereto by the screw 18, which is screw-threaded into the lower end of said pivot post 8, with its head bearing against the lower surface of said shoulder 17, thus rotatably securing the gear plate 11, and the bottom plate 16, to the pivot post 8; while the periphery of said bottom plate 16, rotates upon the bearing surface 3, in the side wall of the case 1. The lower surface of said bottom plate 16, is further provided with two or more integral ribs 19, and the hinged rib 20, beyond the circumference of the case and afford a finger grip for winding, and when not in use may be folded inwardly against the lower surface of said bottom plate 16, flush with the surface of said stationary ribs 19, and adapted to rest upon the usual tripod 10, which is attached to the device by the stud 21, which is screw-threaded into said bottom plate and the lower end of the sleeve 15, below the shoulder 17.

The operating mechanism of the device consists of the main spring 22, which is contained within the case 1, between the plates 11, and 16, with its outer end secured at a suitable point to the side wall of said case 1, and its inner end to the screw 14, thus surrounding the sleeve 15, and when wound up actuating a tension to rotate the case upon said plates 11, and 16, and around the pivot post 8.

Rigidly secured upon the pivot post 8, and in contact with the upper surface of the gear plate 11, is the ratchet wheel 23, which is controlled by the dog 24, mounted upon the upper surface of said plate 11, and formed with a downwardly projecting stud 25, which extends through the slot 26, in said plate 11, said dog being held in normal engagement with said ratchet wheel 23, by the spring 27, and released from engagement by the action of the curved lever 28, which forms an extending arm of the rocker shaft 29, mounted within the bearing pipe 30, which is secured to the sleeve 15, said rocker shaft 29, being formed at its lower end with the lever 31, resting upon the upper surface of the bottom plate 16, and formed with the downwardly projecting finger-catch 60, which is adapted to slide within the slot 32, formed in said bottom plate 16, and thus affording a means for disengaging the dog 24, from the ratchet wheel 23, when it is desired to start the mechanism.

The gear case 33, is formed with a top plate 34, which is secured to the under surface of the top of the case 1, by the screw 61; while within the lower plate or body of said gear case 33, is rotatably mounted the sleeve 35, upon the upper end of which is rigidly secured the ratchet wheel 36, and upon the lower end of which is rigidly secured the pinion 37; while within said sleeve 35, and the top plate 34, is rotatably mounted the vertical shaft 38, upon which is rigidly secured the sprocket wheel 39. The pinion 37, extends below said gear case 33, in such a manner that it is in mesh with and will be rotated by the internal gear 13, and the ratchet wheel 36, coöperating with the dog 40, which is mounted upon the lower surface of the sprocket wheel 39, allows the pinion 37, to be revolved during the process of winding the main spring without rotating said sprocket wheel 39, until it is released by the mechanism provided for that purpose.

The film spool attaching and operating mechanism consists in a vertical shaft 41, mounted in the arm 5, near the outer end thereof, and provided with a projecting upper end squared to receive the spool clamp 42, which is formed with the orifice 43, to receive the winding stud of the camera and the transverse slots 44, to engage the winding handle; this clamp 42, being detachable to facilitate attaching the device to the camera. Below said arm 5, and mounted upon the square body 45, of said shaft 41, is the sprocket wheel 46, which is connected to the sprocket wheel 39, by the chain 47, which passes through the orifices 48, in the side wall of the case 1; while the lower end of said shaft 41, is reduced in diameter, and is journaled in the bracket 49, and is further provided with the finger-ring 50; while its reduced portion 51, within the hub of the sprocket wheel 46, is surrounded by the coil spring 52, which tends to retain said shaft in engagement with the spool clamp 42, when in a normal position, but allowing it to be receded to release said clamp 42.

For regulating the distance through which the case 1, attached to the camera shall be rotated, I provide the friction band 53, which is contained in and guided by the groove 54, in the outer surface of the wall of the case 1, and said band 53, may be retained with the thumb-screw 55, in any desired place by the action of said thumb-screw 55, bearing against the case 1.

Upon the lower surface of the bottom plate 16, near the edge thereof, is rigidly secured the stop 56, which projects outward and upward to engage the screw 55, on the friction band in such a manner that the rotation of the case 1, upon the plates 11, and 16, attached to the tripod will be stopped as soon as the stop 56, and screw 55, come into contact, the distance at which the screw 55, and band 53, are placed ahead of the stop 56, regulating the arc of revolution.

For compensating for the slack of the chain I provide within the case the tension arm 57, which is pivoted at one end to the wall of the case 1, and is bifurcated at the other end and has rotatably mounted therein the idler wheel 58, to engage and bear against said chain by the action of the spring 59.

The attaching and operation of the device as a whole is as follows:—The main spring having been wound by holding the case in one hand and revolving the plates by the use of the hinged rib, with the other hand and the arm 5, having been set to the required radius to accommodate the size of the camera, the case is then secured to the camera in place of the usual tripod, the spool clamps secured and the tripod attached to the bottom plate 16. The friction band is now set to stop the rotation at the required place, and by a slight push on the finger catch 60, of the releasing device is operated and the case secured to and carrying the camera and also revolving the film spool is rotated upon the plates secured to the tripod until retarded by the stop. The tension at which the main spring is wound will regulate the speed at which the attachment revolves without the use of any escapement wheels.

Having thus described my invention what I claim as new and desire to secure by Letters Patent is:—

1. A panoramic attachment for cameras of the class described, comprising a circular case, an arm radiating from and adjustably secured to and within said case; a bottom plate rotatably mounted within said case and provided with a screw-threaded orifice in the bottom thereof to receive the tripod screw; means for rotating said case upon said bottom plate, means for starting said rotation, means for limiting said rotation, means for pivoting said case upon said bottom plate, and means for rotating the film spool of the camera as said case is revolved upon said bottom plate.

2. A panoramic attachment for cameras of the class described, comprising a circular case formed with an orifice in the side wall thereof, an arm radiating from and adjustably mounted within said orifice, said arm formed with a longitudinal slot in the body thereof, screws passing through said slot and screw-threaded into the top of said case for the purpose of adjustably securing said arm to said case; a bottom plate formed with an upwardly extending hollow boss, formed with an inward transverse dividing wall, ribs secured upon the lower surface of said bottom plate, one of said ribs hinged to said plate near the edge thereof and adapted to open outward in a radial relation to said bottom plate, means for rotating said case upon said plate and means for operating the film within the camera by the revolution of said case.

3. A panoramic attachment for cameras of the class described, comprising a circular base plate detachably secured upon the tripod and formed with an upwardly extending hollow boss in the center thereof, a circular case formed with bearing surfaces in the walls thereof, one of said bearing surfaces adapted to engage and revolve upon the edge of said bottom plate, a central pivot post secured to and extending downward within said case, said pivot post reduced in diameter for a portion of its length, a gear plate formed with a downwardly extending hollow boss adapted to embrace and rotate upon the reduced portion of said pivot post, and further adapted to be contained within and detachably secured to the upwardly extending hollow boss of said bottom plate, the edge of said gear plate engaged by one of the bearing surfaces in the wall of said case, means for revolving said circular case upon said gear plate, and means for winding the film spool of the camera by the revolution of said case.

4. A panoramic attachment for cameras of the class described, comprising a circular bottom plate formed with a central upwardly extending hollow boss, a circular gear plate formed with a central downwardly extending hollow boss, adapted to be contained within the boss upon said bottom plate, a locking screw passed through the wall of said outer boss and screw-threaded into the wall of said inner boss, a circular case embracing said plates and formed with concentric bearings adapted to engage and rotate upon said plates, a central pivot post having its upper end secured within said case and the lower portion of its body contained within and detachably and rotatably secured to said hollow bosses, a spring mounted between said plates and surrounding said bosses, and having its inner end secured upon said locking screw and its outer end secured to the wall of said circular case for the purpose of revolving said case upon said plates, and means for controlling the action of said spring.

5. A panoramic attachment for cameras of the class described, comprising a circular bottom plate formed with a central upwardly projecting boss, a gear plate formed with a central downwardly projecting boss, said bosses adapted to telescope upon each other, a circular case formed with bearing surfaces formed in its side wall and adapted to be rotated upon said plates, a central pivot post secured within and to said circular case and having its lower portion rotatably secured within and to said telescoping bosses, a spring mounted within said case between said plates and surrounding said bosses, the inner end of said spring secured to said bosses and the outer end of said spring secured to the wall of said case, a ratchet wheel rigidly secured upon said pivot post above said gear plate, a dog mounted upon said gear plate in engagement with said ratchet wheel, a curved slot formed in said gear plate, a stud secured to and depending from said dog through said slot, a vertical shaft mounted in a bearing secured to said telescoping bosses, a lever integral with the upper end of said shaft and adapted to bear against and operate the stud attached to the dog in said slot for the purpose of releasing said ratchet wheel, and a lever integral with the lower end of said shaft and provided with a depending finger catch adapted to extend through a curved slot in said bottom plate, for the purpose of actuating said shaft.

6. A panoramic attachment for cameras consisting of a circular bottom plate adapted to be detachably secured upon the tripod, a circular gear plate axial with and spaced from said bottom plate, telescoping hollow bosses joining said plates together, a spring mounted between said plates and attached to said bosses, a circular case formed with bearing surfaces engaging said plates, a central pivot post secured within and to said case and having its lower portion contained within and rotatably and detachably secured to said bosses, an internal gear secured upon and concentric with the upper surface of said gear plate, a gear case comprising a top plate and a bottom plate formed with vertical bearings in the body thereof, and adapted to be secured within said circular case, a hollow sleeve mounted in said bearing in said bottom plate, a ratchet wheel rigidly secured upon said sleeve below said plate, a pinion rigidly secured upon said sleeve below said plate and in mesh with said internal gear, a vertical shaft rotatably mounted within said sleeve and the bearing in said top plate, a sprocket wheel rigidly mounted upon said shaft below said top plate, and above said ratchet wheel, a spring actuated dog secured upon the bottom of said sprocket wheel and adapted to engage with said ratchet wheel.

7. A panoramic attachment for cameras of the class described, comprising a circular case rotatably and detachably mounted upon a circular bottom plate, a gear case mounted within said circular case and a sprocket wheel mounted within said gear case, said circular case formed with a horizontal slot in the side thereof, a radial arm extending through said slot and adjustably secured within said circular case, a vertical bearing formed in and near the outer end of said radial arm, a shaft mounted in said bearing, said shaft squared at its upper end above said arm and reduced in diameter and squared below said bearing, a bracket secured to and below said arm and formed with a bearing engaging the lower end of said shaft, a sprocket wheel mounted upon the lower squared portion of said shaft above said bracket, a spring surrounding the reduced portion of said shaft and contained within said wheel, an endless chain joining said sprocket wheel to the sprocket wheel mounted within the gear case and operated thereby, a tension arm pivoted within and to the wall of said case, a sprocket wheel mounted in said tension arm and designed to bear against said chain and means for forcing said wheel against said chain, a film spool clamp formed with a square orifice in the bottom thereof to engage the upper end of the radial arm shaft and a transverse slot in its side wall to engage the film winding handle of the camera.

8. A panoramic attachment for cameras consisting of a bottom plate adapted to be detachably secured to the camera tripod, a main gear plate spaced from and detachably secured to said bottom plate, a circular case rotatably mounted upon and detachably secured to said plates, mechanism secured within said case for the purpose of rotating said case upon and around said plates, an adjustable stopping device for limiting the rotation of said case, comprising an encircling groove formed in the outer surface of said case, a friction band slidably contained in said groove, a set screw threaded through said band and adapted to engage said case for the purpose of locking said band, and a stop secured upon the bottom plate and formed with an extending arm adapted to limit the passage of said set screw, all for the purpose set forth.

In testimony whereof I affix my signature in presence of two witnesses.

FREDERICK F. GROFF.

Witnesses:
Wm. J. Coulter,
Mabel L. Lefevre.